(12) United States Patent
Tani et al.

(10) Patent No.: US 12,640,365 B2
(45) Date of Patent: May 26, 2026

(54) NONAQUEOUS ELECTROLYTE SECONDARY BATTERY

(71) Applicant: Panasonic Intellectual Property Management Co., Ltd., Osaka (JP)

(72) Inventors: Yuji Tani, Osaka (JP); Yuji Goshima, Osaka (JP); Fumiharu Niina, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 565 days.

(21) Appl. No.: 18/027,282

(22) PCT Filed: Sep. 14, 2021

(86) PCT No.: PCT/JP2021/033789
§ 371 (c)(1),
(2) Date: Mar. 20, 2023

(87) PCT Pub. No.: WO2022/070894
PCT Pub. Date: Apr. 7, 2022

(65) Prior Publication Data
US 2023/0378438 A1 Nov. 23, 2023

(30) Foreign Application Priority Data
Sep. 30, 2020 (JP) ................................. 2020-166263

(51) Int. Cl.
*H01M 4/36* (2006.01)
*H01M 4/133* (2010.01)
(Continued)

(52) U.S. Cl.
CPC ........... H01M 4/364 (2013.01); H01M 4/133 (2013.01); H01M 4/137 (2013.01); *H01M 2004/027* (2013.01)

(58) Field of Classification Search
CPC ...... H01M 4/364; H01M 4/133; H01M 4/137; H01M 2004/027
See application file for complete search history.

(56) References Cited

U.S. PATENT DOCUMENTS

2008/0113270 A1* 5/2008 Hirose ................ H01M 50/109
429/231.95
2011/0217577 A1 9/2011 Fukui et al.
(Continued)

FOREIGN PATENT DOCUMENTS

EP 3514866 A1 7/2019
JP 2011-204660 A 10/2011
(Continued)

OTHER PUBLICATIONS

Extended (Supplementary) European Search Report dated Feb. 16, 2024, issued in counterpart EP Application No. 21875196.4. (10 pages).
(Continued)

*Primary Examiner* — Jane J Rhee
(74) *Attorney, Agent, or Firm* — WHDA, LLP

(57) ABSTRACT

This nonaqueous electrolyte secondary battery comprises a positive electrode, a negative electrode, and a nonaqueous electrolyte. The negative electrode includes a negative electrode core and a negative electrode mixture layer formed on at least one surface of the negative electrode core. The ratio (E1/E2) of the charging expansion rate (E1) to the discharge expansion rate (E2) of the negative electrode is at least 1.05 and less than 1.15. The content of silicon material with respect to the mass of a negative electrode active material in the negative electrode mixture layer is 3-12 mass %. Graphite, a first silicon material (SiO), and a second silicon
(Continued)

material (LSX) are preferably included as the negative electrode active material in the negative electrode mixture layer.

4 Claims, 1 Drawing Sheet

(51) Int. Cl.
H01M 4/137 (2010.01)
H01M 4/02 (2006.01)

(56) References Cited

U.S. PATENT DOCUMENTS

| | | |
|---|---|---|
| 2015/0262762 A1 | 9/2015 | Ikenuma et al. |
| 2019/0305375 A1 | 10/2019 | Uehara et al. |
| 2021/0013489 A1 | 1/2021 | Hashitani et al. |
| 2022/0013780 A1 | 1/2022 | Nishitani et al. |

FOREIGN PATENT DOCUMENTS

| | | |
|---|---|---|
| JP | 5229239 B2 | 7/2013 |
| JP | 2013-251147 A | 12/2013 |
| JP | 2019-179724 A | 10/2019 |
| JP | 2019-220350 A | 12/2019 |
| JP | 2020-4736 A | 1/2020 |
| JP | 2020-149821 A | 9/2020 |
| WO | 2019142744 A1 | 7/2019 |
| WO | 2020/110917 A1 | 6/2020 |

OTHER PUBLICATIONS

Gomez-Camer et al., "On the correlation between electrode expansion and cycling stability of graphite/Si electrodes for Li-ion batteries", Carbon, Elsevier Oxford, GB, Apr. 12, 2016, vol. 105, DOI:10.1016/J.CARBON.2016.04.022, ISSN 0008-6223, pp. 42-51, XP029562756 [X], cited in Extended (Supplementary) European Search Report dated Feb. 16, 2024. (10 pages).
International Search Report dated Nov. 22, 2021, issued in counterpart International Application No. PCT/JP2021/033789 (2 pages).

* cited by examiner

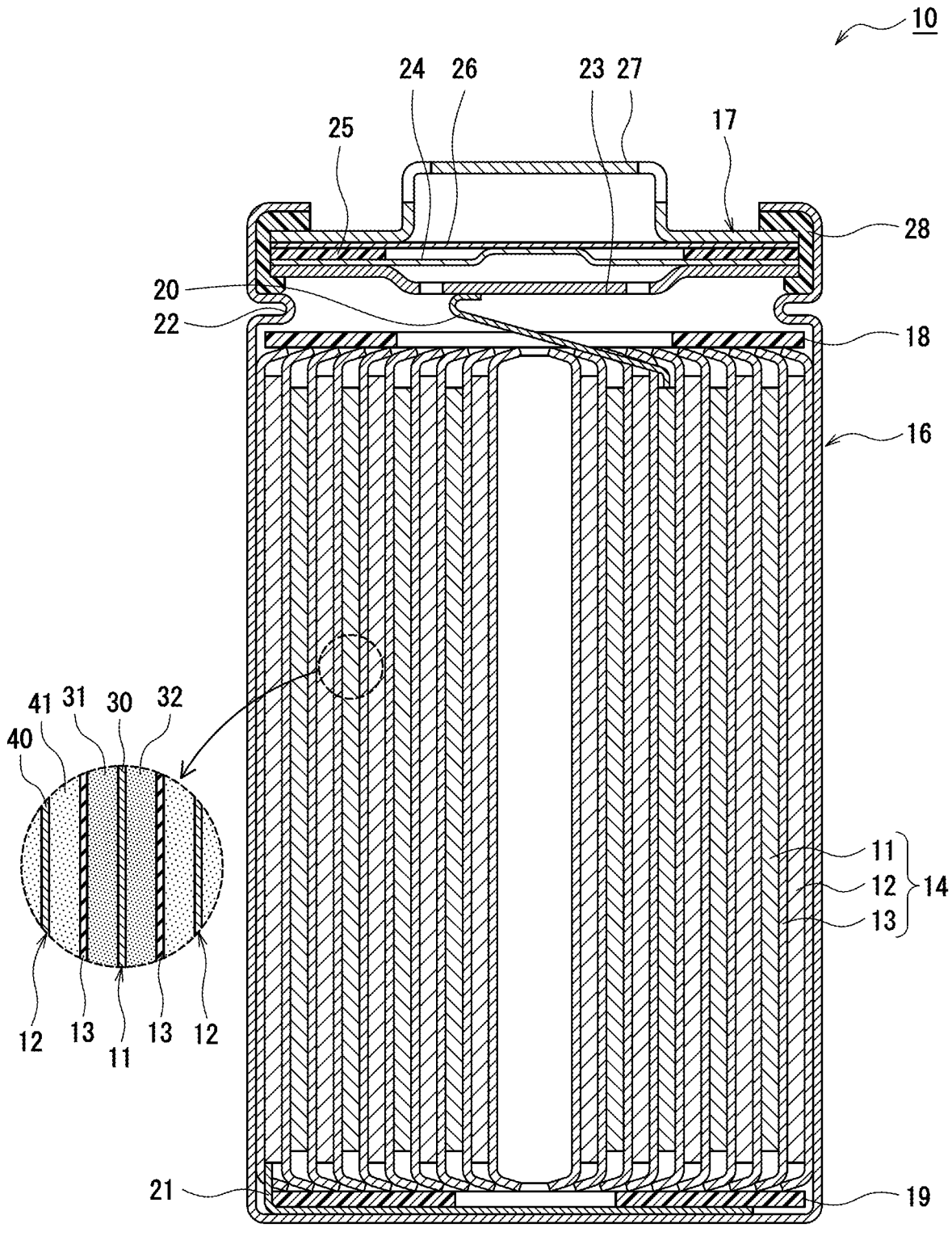

NONAQUEOUS ELECTROLYTE SECONDARY BATTERY

CROSS-REFERENCE TO RELATED APPLICATION

This application is a National Phase Application filed under 35 U.S.C. § 371 of International Application No. PCT/JP2021/033789 filed on Sep. 14, 2021 which claims the benefit of priority under 35 U.S.C. § 119(a) of Japanese Patent Application No. 2020-166263 filed in Japan on Sep. 30, 2020, the contents of which are incorporated herein by reference.

TECHNICAL FIELD

The present disclosure relates to a non-aqueous electrolyte secondary battery, and more particularly to a high-capacity non-aqueous electrolyte secondary battery including a negative electrode containing Si.

BACKGROUND

It is known that Si or a compound containing Si can occlude more lithium ions per unit volume than a carbon-based active material such as graphite can. For example, Patent Literature 1 discloses a non-aqueous electrolyte secondary battery that uses a Si-containing compound as a negative electrode active material. Patent Literature 1 further describes that the cycle characteristic of the battery is improved by configuring such that the ratio of expansion of the negative electrode accompanying lithium insertion is set to greater than or equal to 1.05 and less than 3.0, and such that the equivalence ratio of Li to Si in the negative electrode material when the battery is charged to the charge termination voltage is adjusted to within a specific range.

CITATION LIST

Patent Literature

PATENT LITERATURE 1: Japanese Patent No. 5229239

SUMMARY

A negative electrode containing Si has a problem that it undergoes large volume changes upon charging and discharging, and due to this, the battery charge/discharge cycle characteristic becomes deteriorated. The large volume changes of the negative electrode upon charging and discharging promote decomposition of the electrolyte, and this is one factor that contributes to deterioration of the cycle characteristic. The non-aqueous electrolyte secondary battery of Patent Literature 1 still has room for improvement in terms of cycle characteristic.

A non-aqueous electrolyte secondary battery according to the present disclosure is a non-aqueous electrolyte secondary battery including a positive electrode, a negative electrode, and a non-aqueous electrolyte. The negative electrode includes a negative electrode core and a negative electrode mixture layer formed on at least one surface of the negative electrode core. The ratio (E1/E2) of the charge expansion ratio (E1) to the discharge expansion ratio (E2) of the negative electrode is greater than or equal to 1.05 and less than 1.15. Further, in the negative electrode mixture layer, the content of silicon material relative to the mass of negative electrode active material is greater than or equal to 3 mass % and less than or equal to 12 mass %.

Advantageous Effects of Invention

The non-aqueous electrolyte secondary battery according to the present disclosure is a high-capacity battery having a negative electrode containing Si, and has an excellent cycle characteristic.

BRIEF DESCRIPTION OF DRAWINGS

FIG. 1 is a cross-sectional view of a non-aqueous electrolyte secondary battery according to an example embodiment.

DESCRIPTION OF EMBODIMENTS

As described above, a non-aqueous electrolyte secondary battery having a negative electrode containing Si has a high capacity, but has the problem that large volume changes occur in the negative electrode upon charging and discharging, and due to this, the cycle characteristic becomes deteriorated. In order to improve the cycle characteristic of such a battery, the present inventors have conducted intensive studies focusing on the ratio (E1/E2) of the charge expansion ratio (E1) to the discharge expansion ratio (E2) of the negative electrode, and found as a result that the cycle characteristic is specifically improved when the ratio (E1/E2) is greater than or equal to 1.05 and less than 1.15. A non-aqueous electrolyte secondary battery that satisfies the condition of $1.05 \leq (E1/E2) < 1.15$ has a superior cycle characteristic as compared to a battery that does not satisfy this condition.

An example embodiment of a non-aqueous electrolyte secondary battery according to the present disclosure will now be described in detail by reference to the drawings. It is envisioned from the beginning that a plurality of embodiments and variants described below may be selectively combined.

Although a cylindrical battery in which a spiral-type electrode assembly 14 is housed in a bottomed cylindrical outer housing can 16 is described below as an example, the battery outer housing is not limited to a cylindrical outer housing can, and may for example be a rectangular outer housing can (i.e., a rectangular battery) or a coin-shaped outer housing can (i.e., a coin-shaped battery), or may be an outer housing made of a laminate sheet including a metal layer and a resin layer (i.e., a laminate battery). Further, the electrode assembly may be a laminate-type electrode assembly in which a plurality of positive electrodes and a plurality of negative electrodes are alternately laminated via separators.

FIG. 1 is a cross-sectional view of a non-aqueous electrolyte secondary battery 10 according to an example embodiment. As shown in FIG. 1, the non-aqueous electrolyte secondary battery 10 comprises a spiral-type electrode assembly 14, a non-aqueous electrolyte, and an outer housing can 16 that houses the electrode assembly 14 and the electrolyte. The electrode assembly 14 includes a positive electrode 11, a negative electrode 12, and separators 13, and has a spiral structure in which the positive electrode 11 and the negative electrode 12 are wound in a spiral shape with the separators 13 interposed between the electrodes 12, 13. The outer housing can 16 is a bottomed cylindrical metal container having an opening on one side in the axial direction, and the opening of the outer housing can 16 is closed by a sealing assembly 17. In the following, for convenience of explanation, the sealing assembly 17 side of the battery is referred to as the top, and the bottom portion side of the outer housing can 16 is referred to as the bottom.

The positive electrode 11, the negative electrode 12, and the separators 13, which constitute the electrode assembly 14, are all long strip-shaped members, and are alternately laminated in the radial direction of the electrode assembly 14 by being wound in a spiral shape. The negative electrode 12 is formed to have a size somewhat larger than that of the positive electrode 11 in order to prevent precipitation of lithium. That is, the negative electrode 12 is formed longer than the positive electrode 11 in the lengthwise direction and in the widthwise direction (i.e., the shorter direction). The separators 13 are formed somewhat larger than at least the positive electrode 11, and two separators are arranged so as to sandwich the positive electrode 11. The electrode assembly 14 has a positive electrode lead 20 connected to the positive electrode 11 by welding or the like, and a negative electrode lead 21 connected to the negative electrode 12 by welding or the like.

Insulation plates 18 and 19 are respectively arranged above and below the electrode assembly 14. In the example shown in FIG. 1, the positive electrode lead 20 extends through a through hole in the insulation plate 18 and toward the sealing assembly 17, while the negative electrode lead 21 extends outside the insulation plate 19 and toward the bottom portion of the outer housing can 16. The positive electrode lead 20 is connected to the lower surface of an internal terminal plate 23 of the sealing assembly 17 by welding or the like, and a cap 27, which is the top plate of the sealing assembly 17 electrically connected to the internal terminal plate 23, serves as the positive electrode terminal. The negative electrode lead 21 is connected to the inner surface of the bottom portion of the outer housing can 16 by welding or the like, and the outer housing can 16 serves as the negative electrode terminal.

As described above, the outer housing can 16 is a bottomed cylindrical metal container having an opening on one side in the axial direction. A gasket 28 is provided between the outer housing can 16 and the sealing assembly 17 so as to ensure airtightness inside the battery and insulation between the outer housing can 16 and the sealing assembly 17. The outer housing can 16 has formed thereon a grooved portion 22, in which a part of a side surface portion protrudes inward and supports the sealing assembly 17. The grooved portion 22 is preferably formed in an annular shape along the circumferential direction of the outer housing can 16, and supports the sealing assembly 17 on its upper surface. The sealing assembly 17 is fixed to an upper part of the outer housing can 16 by means of the grooved portion 22 and an opening end portion of the outer housing can 16 which is crimped to the sealing assembly 17.

The sealing assembly 17 has a structure obtained by laminating, in order from the electrode assembly 14 side, the internal terminal plate 23, a lower valve member 24, an insulation member 25, an upper valve member 26, and the cap 27. Each of the members constituting the sealing assembly 17 has, for example, a disk shape or a ring shape, and the respective members except the insulation member 25 are mutually electrically connected. The lower valve member 24 and the upper valve member 26 are connected to each other at their central portions, and the insulation member 25 is interposed between peripheral edge portions of these valve members. When an abnormality occurs in the battery and the internal pressure increases, the lower valve member 24 deforms and ruptures in a manner pushing up the upper valve member 26 toward the cap 27, and the current path between the lower valve member 24 and the upper valve member 26 is thereby cut off. When the internal pressure increases further, the upper valve member 26 ruptures, and gas is discharged from an opening in the cap 27.

A detailed description will now be given regarding the positive electrode 11, the negative electrode 12, the separators 13, and the non-aqueous electrolyte, which constitute the non-aqueous electrolyte secondary battery 10, and in particular regarding the negative electrode 12.

[Positive Electrode]

The positive electrode 11 comprises a positive electrode core 30 and a positive electrode mixture layer 31 formed on at least one surface of the positive electrode core 30. As the positive electrode core 30, it is possible to use: a foil of a metal, such as aluminum or an aluminum alloy, that is stable in the potential range of the positive electrode 11; a film having such a metal disposed on its surface layer; and the like. The positive electrode mixture layer 31 contains a positive electrode active material, a conductive agent, and a binder, and is preferably formed on both sides of the positive electrode core 30. The positive electrode 11 can be produced by applying a positive electrode mixture slurry containing the positive electrode active material, the conductive agent, the binder, and the like onto the positive electrode core 30, drying the applied coating, and then compressing the coating to thereby form positive electrode mixture layers 31 on both sides of the positive electrode core 30.

As the positive electrode active material, a lithium transition metal composite oxide is used. Examples of elements contained in the lithium transition metal composite oxide include Ni, Co, Mn, Al, B, Mg, Ti, V, Cr, Fe, Cu, Zn, Ga, Sr, Zr, Nb, In, Sn, Ta, and W. A preferred example of the lithium transition metal composite oxide is a composite oxide containing at least one selected from Ni, Co, Mn, and Al. Specific examples thereof include: a NCM-based composite oxide containing Ni, Co and Mn; and a NCA-based composite oxide containing Ni, Co, and Al. Here, particles of inorganic compounds such as aluminum oxide and a lanthanoid-containing compound may be adhered to the surface of particles of the lithium transition metal composite oxide.

Examples of the conductive agent contained in the positive electrode mixture layer 31 include carbon materials such as carbon black, acetylene black, Ketjen black, and graphite. Examples of the binder contained in the positive electrode mixture layer 31 include fluororesins such as polytetrafluoroethylene (PTFE) and polyvinylidene fluoride (PVdF), polyacrylonitrile (PAN), polyimides, acrylic resins, and polyolefins. These resins may be used in combination with carboxymethyl cellulose (CMC), salts of CMC, polyethylene oxide (PEO), and the like.

[Negative Electrode]

The negative electrode 12 comprises a negative electrode core 40 and a negative electrode mixture layer 41 formed on at least one surface of the negative electrode core 40. As the negative electrode core 40, it is possible to use: a foil of a metal, such as copper or a copper alloy, that is stable in the potential range of the negative electrode; a film having such a metal disposed on its surface layer; and the like. The negative electrode mixture layer 41 contains a negative electrode active material, a conductive agent, and a binder, and is preferably formed on both sides of the negative electrode core 40. The negative electrode 12 can be produced by applying a negative electrode mixture slurry containing the negative electrode active material, the conductive agent, the binder, and the like onto the negative electrode core 40, drying the applied coating, and then compressing the coating to thereby form negative electrode mixture layers 41 on both sides of the negative electrode core 40.

As will be described later in detail, the negative electrode 12 is such that its ratio (E1/E2) of the charge expansion ratio (E1) to the discharge expansion ratio (E2) is greater than or equal to 1.05 and less than 1.15, and, in the negative electrode mixture layer 41, the content of silicon material relative to the mass of the negative electrode active material is greater than or equal to 3 mass % and less than or equal to 12 mass %. According to the negative electrode 12 satisfying this condition, the cycle characteristic of the non-aqueous electrolyte secondary battery 10 is specifically improved. The negative electrode mixture layer 41 may contain Si as a simple substance, but the Si is preferably present as a silicon material in the form of a Si-containing compound which undergoes smaller volume changes during charging and discharging than does Si.

The thickness of the negative electrode mixture layer 41 on one side of the negative electrode core 40 is, for example, greater than or equal to 30 μm and less than or equal to 120 μm, or greater than or equal to 50 μm and less than or equal to 80 μm. In terms of achieving high capacity, the packing density of the negative electrode mixture layer 41 is preferably 1.5 g/cm³ or higher. A preferred example of the packing density of the negative electrode mixture layer 41 is greater than or equal to 1.5 g/cm³ and less than or equal to 1.9 g/cm³, or greater than or equal to 1.6 g/cm³ and less than or equal to 1.8 g/cm³. The negative electrode mixture layer 41 is not limited to having a single-layer structure, and may be composed of a plurality of layers.

As the negative electrode active material, the negative electrode mixture layer 41 preferably contains: graphite; a first silicon material (SiO) containing a silicon oxide phase and Si dispersed in the silicon oxide phase; and a second silicon material (LSX) containing a lithium silicate phase and Si dispersed in the lithium silicate phase. Use of the graphite and the silicon materials in combination facilitates simultaneously achieving high capacity and good cycle characteristic. The negative electrode mixture layer 41 may contain negative electrode active materials other than the graphite and the two types of silicon materials so long as the object of the present disclosure is not impaired.

A preferred example of the graphite content is greater than or equal to 70 mass % and less than or equal to 97 mass %, greater than or equal to 80 mass % and less than or equal to 96 mass %, or greater than or equal to 85 mass % and less than or equal to 95 mass %, relative to the mass of the negative electrode active material. That is, a preferred example of the silicon material content is greater than or equal to 3 mass % and less than or equal to 30 mass %, greater than or equal to 4 mass % and less than or equal to 20 mass %, or greater than or equal to 5 mass % and less than or equal to 15 mass %, relative to the mass of the negative electrode active material. The content of the negative electrode active material is, for example, greater than or equal to 90 mass % and less than or equal to 99 mass %, or greater than or equal to 93 mass % and less than or equal to 98 mass %, relative to the total mass of the negative electrode mixture layer 41. As described above, the negative electrode mixture layer 41 preferably contains a conductive agent and a binder as components other than the negative electrode active material.

As the graphite, natural graphite such as flake graphite, and artificial graphite such as massive artificial graphite and graphitized mesophase carbon microbeads are used. The BET specific surface area of the graphite is, for example, greater than or equal to 0.5 m²/g and less than or equal to 7.5 m²/g, or greater than or equal to 1 m²/g and less than or equal to 5 m²% g. The BET specific surface area is measured according to the BET method (i.e., the nitrogen adsorption method) described in JIS R 1626. An example of the volume-based median diameter (D50) of the graphite is greater than or equal to 1 μm and less than or equal to 20 μm, or greater than or equal to 2 in and less than or equal to 15 μm. D50 is the particle size at which, in a particle size distribution measured by a laser diffraction/scattering method, the integrated volume value reaches 50%. The graphite may be composed of individual primary particles, or may be secondary particles formed by agglomeration of a plurality of primary particles.

The first silicon material (SiO) and the second silicon material (LSX) are, for example, particles whose D50 is smaller than the D50 of the graphite. An example of the D50 of the SiO and the LSX is greater than or equal to 1 μm and less than or equal to 15 μm, or greater than or equal to 3 in and less than or equal to 10 μm. On the surface of the particles of the SiO and the LSX, a conductive layer composed of a highly conductive material may be formed. A preferred example of the conductive layer is a carbon coating composed of a carbon material. In consideration of ensuring conductivity and diffusivity of lithium ions into the inside of the particles, the thickness of the conductive layer is preferably greater than or equal to 1 nm and less than or equal to 200 nm, or greater than or equal to 5 nm and less than or equal to 100 nm.

The above-noted carbon coating is composed of, for example, carbon black, acetylene black, Ketjen black, graphite, a mixture of two or more of the foregoing, or the like. Examples of a method for forming the carbon coating on the surface of the SiO and LSX particles include a CVD method using acetylene, methane, or the like, and a method in which coal pitch, petroleum pitch, phenol resin, or the like is mixed with the SiO and LSX particles and then heat treatment is performed. Further, the carbon coating may be formed by adhering carbon powder such as carbon black to the particle surface using a binder. The carbon coating is formed to have a mass of, for example, greater than or equal to 0.5 mass % and less than or equal to 10 mass % relative to the mass of the SiO and LSX particles.

The SiO has a particle structure in which fine Si particles are dispersed in a silicon oxide phase. A preferred SiO has a sea-island structure in which fine Si particles are substantially uniformly dispersed in a matrix of amorphous silicon oxide, and is represented by general formula SiO. (where $0.5 \leq x \leq 1.6$). In terms of simultaneously achieving sufficient battery capacity and cycle characteristic, the Si particle content is preferably greater than or equal to 35 mass % and less than or equal to 75 mass % relative to the total mass of the SiO. For example, when the Si particle content is too low, the charge/discharge capacity decreases, and when the Si particle content is too high, a part of the Si particles that is exposed without being covered with silicon oxide comes into contact with the electrolyte solution, and the cycle characteristic deteriorates.

The average particle size of the Si particles dispersed in the silicon oxide phase is, for example, 500 nm or smaller, preferably 200 nm or smaller, or 50 nm or smaller at a point before charging and discharging, and after charging and discharging, the average particle size is, for example, 400 nm or smaller or 100 nm or smaller. By micronizing the Si particles, volume changes during charging and discharging are reduced, and the cycle characteristic is improved. The average particle size of the Si particles is determined as an average value of the longest diameters of 100 Si particles measured by observing cross sections of the SiO particles using a scanning electron microscope (SEM) or a transmission electron microscope (TEM). The silicon oxide phase is composed of an assembly of particles finer than the Si particles.

The LSX has a particle structure in which fine Si particles are dispersed in a lithium silicate phase. A preferred LSX has a sea-island structure in which fine Si particles are substantially uniformly dispersed in a matrix of lithium silicate represented by general formula $Li_{2z}SiO_{(2+z)}$ (where 0<z<2). The Si particle content is preferably greater than or equal to 35 mass % and less than or equal to 75 mass % relative to the total mass of the LSX, as with the SiO. The average particle size of the Si particles is, for example, 500 nm or smaller, preferably 200 nm or smaller, or 50 nm or smaller at a point before charging and discharging. The lithium silicate phase is composed of an assembly of particles finer than the Si particles.

The lithium silicate phase is preferably composed of a compound represented by $Li_{2z}SiO_{(2+z)}$ (where 0<z<2). That is, the lithium silicate phase does not include $Li_4SiO_4$ (i.e., z=2). Since $Li_4SiO_4$ is an unstable compound and reacts with water to exhibit alkalinity, $Li_4SiO_4$ may cause Si to be altered and cause a decrease in charge/discharge capacity. In terms of stability, ease of production, lithium ion conductivity, and the like, the lithium silicate phase preferably contains $Li_2SiO_3$ (i.e., Z=1) or $Li_2Si_2O_5$ (i.e., Z=½) as the main component. When $Li_2SiO_3$ or $Li_2Si_2O_5$ is the main component, the main component content is preferably more than 50 mass %, and more preferably 80 mass % or higher, relative to the total mass of the lithium silicate phase.

The SiO can be produced, for example, by the following steps 1 to 3.

(1) Prepare a mixture by mixing Si and silicon oxide in a weight ratio of 20:80 to 95:5.

(2) At least before or after the preparation of the above mixture, pulverize the Si and the silicon oxide into fine particles using a ball mill.

(3) Heat-treat the pulverized mixture at greater than or equal to 600° C. and less than or equal to 1000° C. in an inert atmosphere.

Here, the LSX can be produced by using lithium silicate instead of silicon oxide in the above steps.

In the above heat treatment, pressure may be applied as in hot pressing to produce a sintered product composed of the above-described mixture. In that case, the sintered product is pulverized to a predetermined particle size. Here, the lithium silicate represented by $Li_{2z}SiO_{(2+z)}$ (where 0<z<2) is stable and does not react with Si in the temperature range of greater than or equal to 600° C. and less than or equal to 1000° C., so that the capacity does not decrease. It is also possible to produce the LSX without using a ball mill, by synthesizing Si nanoparticles and lithium silicate nanoparticles, and mixing and heat-treating these nanoparticles.

As described above, the negative electrode 12 is such that its ratio (E1/E2) of the charge expansion ratio (E1) to the discharge expansion ratio (E2) is greater than or equal to 1.05 and less than 1.15. Since the cycle characteristic is greatly deteriorated when the ratio (E1/E2) is less than 1.05, or 1.15 or greater, it is necessary to produce the negative electrode 12 so that the condition of 1.05≤(E1/E2)<1.15 is satisfied. In the present specification, each of the charge expansion ratio (E1) and the discharge expansion ratio (E2) is measured by producing the non-aqueous electrolyte secondary battery 10, subsequently performing an aging process, and after performing charging and discharging for the second time, disassembling the battery.

The charge/discharge conditions of the non-aqueous electrolyte secondary battery 10 in the measurement of the charge expansion ratio (E1) and the discharge expansion ratio (E2) are as described below. The negative electrode is taken out from the disassembled battery, and the thickness of the negative electrode mixture layer is measured and compared to the thickness of the negative electrode mixture layer as measured immediately after production of the negative electrode, to thereby determine an expansion ratio.

[Charge/Discharge Conditions]

In a temperature environment of 25° C., the non-aqueous electrolyte secondary battery 10 is subjected to constant current charging at a constant current of 0.2 It until the battery voltage reaches 4.2 V, and then subjected to constant voltage charging at 4.2 V until the current value reaches 0.02 It. After that, constant current discharging is performed at a constant current of 0.2 It until the battery voltage reaches 3.0 V. Charging is again performed under the same conditions, and the battery in the charged state is disassembled to measure the charge expansion ratio (E1). On the other hand, charging and discharging are again performed under the same conditions, and the battery in the discharged state is disassembled to measure the discharge expansion ratio (E2).

A more preferred range of the ratio (E1/E2) is, for example, greater than or equal to 1.06 and less than or equal to 1.13, or greater than or equal to 1.07 and less than or equal to 1.10. While the ratio (E1/E2) is significantly affected by the presence or absence and the content of the SiO and the LSX in the negative electrode mixture layer 41, the ratio (E1/E2) is also changed depending on the type, mixing ratio, and the like of components other than the silicon materials such as the conductive agent and the binder, and a plurality of control factors are present. Accordingly, it is necessary to produce the negative electrode 12 by adjusting these factors such that the ratio (E1/E2) falls within the above-noted range.

The content of the silicon materials (i.e., the SiO and the LSX) in the negative electrode mixture layer 41 is greater than or equal to 3 mass % and less than or equal to 12 mass %, and preferably greater than or equal to 3 mass % and less than or equal to 9 mass %, relative to the mass of the negative electrode active material. The SiO and the LSX are added to the negative electrode mixture slurry for forming the negative electrode mixture layer 41 such that the content thereof relative to the mass of the negative electrode active material becomes greater than or equal to 3 mass % and less than or equal to 12 mass %. When the silicon material content is beyond this range, it is difficult to satisfy the condition of the ratio (E1/E2), and high capacity and good cycle characteristic cannot be simultaneously achieved.

The negative electrode mixture layer 41 preferably contains the LSX in an amount of 1 mass % or more relative to the mass of the negative electrode active material. The LSX has a higher charge/discharge efficiency than the SiO, and its volume changes accompanying charging and discharging are gradual, so that addition of the LSX in an amount of 1 mass % or more facilitates adjustment of the ratio (E1/E2). On the other hand, the LSX must be added in such a manner that the silicon material content relative to the negative electrode active material does not exceed 12 mass %. The upper limit of the LSX content is, for example, 10 mass % relative to the mass of the negative electrode active material. A preferred example of the LSX content is greater than or equal to 1 mass % and less than or equal to 10 mass %, or greater than or equal to 2 mass % and less than or equal to 8 mass %.

The ratio of the mass of the LSX to the mass of the SiO is, for example, greater than or equal to 0.2 and less than or equal to 6. By controlling the mass ratio of the SiO and the LSX to greater than or equal to 0.2 less than or equal to 6, adjustment of the ratio (E1/E2) is facilitated, and high capacity and good cycle characteristic can be simultaneously achieved. Further, in order to improve the cycle characteristic of the battery, the charge/discharge efficiency of the positive electrode 11 and the negative electrode 12 may be set to the same level. The combined use of the SiO and the LSX facilitates such adjustment of charge/discharge efficiency. A more preferred range of the mass ratio of the SiO and the LSX is greater than or equal to 0.5 and less than or equal to 5, or greater than or equal to 0.6 and less than or equal to 3, or greater than or equal to 0.8 and less than or equal to 2, or greater than or equal to 1 and less than or equal to 1.5.

The negative electrode mixture layer 41 preferably contains carbon nanotubes (CNTs) in an amount of greater than or equal to 0.01 mass % and less than or equal to 0.1 mass %, or greater than or equal to 0.05 mass % and less than or equal to 0.1 mass %, relative to the mass of the negative electrode active material. The CNTs function as a conductive agent, and form a good conductive path in the negative electrode mixture layer 41. The CNTs may be not only single-walled CNTs, but also double-walled CNTs, multi-walled CNTs. and mixtures thereof. The CNTs may be vapor-grown carbon fibers called VGCF (registered trademark). For example, the CNTs have a diameter of greater than or equal to 2 nm and less than or equal to 20 μm and an overall length of greater than or equal to 0.03 μm and less than or equal to 500 μm.

The negative electrode mixture layer 41 preferably contains carboxymethyl cellulose (CMC) or a salt thereof, a styrene-butadiene copolymer (SBR), and polyacrylic acid (PAA) or a salt thereof in an amount of greater than or equal to 0.1 mass % or less than or equal to 3 mass % relative to the mass of the negative electrode active material. By using the CNTs as the conductive agent and using these three types of compounds as the binder, high capacity and good cycle characteristic are easily simultaneously achieved. The CNTs and these binders are control factors of the ratio (E1/E2). The negative electrode mixture layer 41 may contain other conductive agents, binders, and the like.

[Separator]

As the separator 13, a porous sheet having ion permeability and insulating property is used. Specific examples of the porous sheet include a microporous thin film, a woven fabric, and a non-woven fabric. As the material of the separator 13, polyolefins such as polyethylene, polypropylene, and a copolymer of ethylene and α-olefin, cellulose, and the like are preferred. The separator 13 may have either a single-layer structure or a multi-layer structure. The surface of the separator 13 may have formed thereon: a heat-resistant layer containing inorganic particles; a heat-resistant layer composed of a highly heat-resistant resin such as aramid resin, polyimide, or polyamide-imide; or the like.

[Non-Aqueous Electrolyte]

The non-aqueous electrolyte contains, for example, a non-aqueous solvent and an electrolyte salt dissolved in the non-aqueous solvent. As the non-aqueous solvent, it is possible to use, for example, esters, ethers, nitriles such as acetonitrile, amides such as dimethylformamide, a mixed solvent containing two or more of the foregoing, and the like. The non-aqueous solvent may contain a halogen-substituted product obtained by substituting at least a part of hydrogens in the above solvents with halogen atoms such as fluorine. Examples of the halogen-substituted product include fluorinated cyclic carbonate esters such as fluoroethylene carbonate (FEC), fluorinated chain carbonate esters, and fluorinated chain carboxylic acid esters such as methyl fluoropropionate (FMP).

Examples of the above-noted esters include: cyclic carbonate esters such as ethylene carbonate (EC), propylene carbonate (PC), and butylene carbonate; chain carbonate esters such as dimethyl carbonate (DMC), ethyl methyl carbonate (EMC), diethyl carbonate (DEC), methyl propyl carbonate, ethyl propyl carbonate, and methyl isopropyl carbonate; cyclic carboxylate esters such as γ-butyrolactone (GBL) and γ-valerolactone (GVL); and chain carboxylate esters such as methyl acetate, ethyl acetate, propyl acetate, methyl propionate (MP), and ethyl propionate (EP).

Examples of the above-noted ethers include: cyclic ethers such as 1,3-dioxolane, 4-methyl-1,3-dioxolane, tetrahydrofuran, 2-methyltetrahydrofran, propylene oxide, 1,2-butylene oxide, 1,3-dioxane, 1,4-dioxane, 1,3,5-trioxane, furan, 2-methylfuran, 1,8-cineole, and crown ethers; and chain ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxy toluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

The electrolyte salt is preferably lithium salt. Examples of lithium salt include $LiBF_4$, $LiClO_4$, $LiPF_6$, $LiAsF_6$, $LiSbF_6$, $LiAlCl_4$, $LiSCN$, $LiCF_3SO_3$, $LiCF_3CO_2$, $Li(P(C_2O_4)F_4)$. $LiPF_{6-x}(C_nF_{2n+1})_x$ (where $1<x<6$, and n is 1 or 2). $LiB_{10}Cl_{10}$, $LiCl$, $LiBr$, $LiI$, chloroborane lithium, lower aliphatic lithium carboxylate, borates such as $Li_2B_4O_7$ and $Li(B(C_2O_4)F_2)$, and imide salts such as $LiN(SO_2CF_3)_2$ and $LiN(C_lF_{2l+1}SO_2)(C_mF_{2m+1}SO_2)$ (where each of l and m is an integer of 0 or greater). As the lithium salt, a single type among the above may be used alone, or a plurality of types may be mixed and used. Among the foregoing, it is preferable to use $LiPF_6$ in consideration of ion conductivity, electrochemical stability, and the like. The concentration of the lithium salt may be, for example, 0.8 mol or higher and 1.8 mol or less per 1 liter of the non-aqueous solvent. Further, vinylene carbonate, a propane sultone based additive, and the like may be added.

EXAMPLES

While the present disclosure is further described below by reference to Examples, the present disclosure is not limited to these Examples.

Example 1

[Positive Electrode]

As the positive electrode active material, lithium nickel cobalt aluminum oxide was used. A positive electrode mixture slurry was prepared by mixing 98.0 parts by mass of the positive electrode active material, 1.0 part by mass of acetylene black, and 1.0 part by mass of polyvinylidene fluoride PVDF, and further adding an appropriate amount of N-methyl-2-pyrrolidone (NMP). Next, the positive electrode mixture slurry was applied to a positive electrode core made of aluminum foil while leaving out the portion to be connected with a lead, and the applied coating was dried. After the applied coating was rolled using a roller, the product was cut into a predetermined electrode size, and a positive electrode having positive electrode mixture layers formed on both sides of a positive electrode current collector was thereby produced.

[Negative Electrode]

As the negative electrode active material, a mixture obtained by mixing the following components in a mass ratio of 94:3:3 was used: graphite; a first silicon material (SiO)) represented by SiOx (where x=1) in which Si particles were dispersed in a silicon oxide phase; and a second silicon material (LSX) in which Si particles were dispersed in a lithium silicate phase containing $Li_2Si_2O_5$ as the main component. A carbon coating was formed on the surface of particles of the SiO and the LSX. The mass ratio of LSX/SiO was 1.

A negative electrode mixture slurry was prepared by mixing the above-described negative electrode active material, a sodium salt of carboxymethyl cellulose (CMC-Na), a dispersion of a styrene-butadiene copolymer (SBR), a lithium salt of polyacrylic acid (PAA) (PAA-Na), and carbon nanotubes (CNTs) in a solid content mass ratio of 100:0.9: 1.2:0.7:0.05, and adding an appropriate amount of water. Next, the negative electrode mixture slurry was applied to a negative electrode core made of copper foil while leaving out the portion to be connected with a lead, and the applied coating was dried. After the applied coating was rolled using a roller, the product was cut into a predetermined electrode size, and a negative electrode having negative electrode mixture layers formed on both sides of the negative electrode core was thereby produced.

[Preparation of Non-Aqueous Electrolyte Solution]

To a mixed solvent obtained by mixing ethylene carbonate (EC) and methyl ethyl carbonate (MEC) in a volume ratio of 3:7 (at 25° C. and at 1 atm), $LiPF_6$ was added at a concentration of 1 mol/L, and vinylene carbonate was further added at a concentration of 2 mass %. A non-aqueous electrolyte solution was thereby prepared.

[Test Cell]

Leads were attached to the above-described positive electrode and the above-described negative electrode, respectively, and the positive electrode and the negative electrode were wound in a spiral shape with a separator interposed between the two electrodes. After attaching a winding fixation tape to the outermost peripheral surface of the spiral assembly, the spiral assembly was pressed in the radial direction, and a flat-shaped spiral electrode assembly was thereby produced. As the separator, a single-layer polypropylene separator was used. After inserting the produced electrode assembly into an outer housing made of aluminum laminate sheet, the above-described non-aqueous electrolyte was injected therein, and the opening of the outer housing was sealed. A test cell (i.e., a laminate cell) was thereby produced.

Regarding the above test cell, the charge expansion ratio (E1) and the discharge expansion ratio (E2) of the negative electrode were measured by the method described above, and the ratio (E1/E2) of the charge expansion ratio (E1) to the discharge expansion ratio (E2) was calculated. As a result, the ratio (E1/E2) was 1.08 (the same calculation was also performed regarding other Examples and Comparative Examples).

Example 2

A negative electrode and a test cell were produced in the same manner as in Example 1 except that, as the negative electrode active material, a mixture of the graphite, the SiO, and the LSX mixed in a mass ratio of 92.5:4.5:3.0 was used. In the negative electrode of Example 2, the mass ratio of LSX/SiO was 1.5.

Example 3

A negative electrode and a test cell were produced in the same manner as in Example 1 except that, as the negative electrode active material, a mixture of the graphite, the SiO, and the LSX mixed in a mass ratio of 92.0:5.0:3.0 was used. In the negative electrode of Example 3, the mass ratio of LSX/SiO was 1.7, and the Si content in the negative electrode mixture layer was 8.0 mass %.

Example 4

A negative electrode and a test cell were produced in the same manner as in Example 1 except that, as the negative electrode active material, a mixture of the graphite and the LSX mixed in a mass ratio of 94.0:6.0 was used.

Comparative Example 1

A negative electrode and a test cell were produced in the same manner as in Example 1 except that, as the negative electrode active material, a mixture of the graphite and the SiO mixed in a mass ratio of 92.5:7.5 was used.

Comparative Example 2

A negative electrode and a test cell were produced in the same manner as in Example 1 except that, as the negative electrode active material, a mixture of the graphite and the SiO mixed in a mass ratio of 90:10 was used.

Comparative Example 3

A negative electrode and a test cell were produced in the same manner as in Example 1 except that, as the negative electrode active material, a mixture of the graphite and the SiO mixed in a mass ratio of 80:20 was used.

Comparative Example 4

A negative electrode and a test cell were produced in the same manner as in Example 1 except that, as the negative electrode active material, a mixture of the graphite and the LSX mixed in a mass ratio of 90:10 was used.

Regarding each of the above-described test cells, evaluation of the cycle characteristic was performed by the following method. The evaluation results are shown in Table 1 together with the constitution of the negative electrodes.

[Evaluation of Cycle Characteristic (Capacity Retention Rate)]

In a temperature environment of 25° C., the test cell was subjected to constant current charging at a constant current of 0.2 It until the battery voltage reached 4.2 V. and then subjected to constant voltage charging at 4.2 V until the current value reached 0.02 It. After that, constant current discharging was performed at a constant current of 0.2 It until the battery voltage reached 3.0 V. This charging and discharging process was performed for 100 cycles, and the capacity retention rate in the charge/discharge cycles was determined based on the following formula. Each of the capacity retention rates shown in Table 1 is a relative value determined using the capacity retention rate of the test cell of Example 1 as the reference value (i.e., 100).

$$\text{Capacity Retention Rate}=(\text{Discharge Capacity in the 100th cycle/Discharge Capacity in the 1st Cycle})\times 100$$

TABLE 1

|  | E1/E2 | LSX | SiO | LSX/SiO | Capacity Retention Rate |
|---|---|---|---|---|---|
| Example 1 | 1.08 | 2.0 mass % | 2.0 mass % | 1.0 | 100 |
| Example 2 | 1.11 | 4.5 mass % | 3.0 mass % | 1.5 | 99 |
| Example 3 | 1.12 | 5.0 mass % | 3.0 mass % | 1.9 | 98 |
| Example 4 | 1.06 | 6.0 mass % | 0 mass % | 0 | 97 |
| Comparative Example 1 | 1.15 | 0 mass % | 7.5 mass % | 0 | 93 |
| Comparative Example 2 | 1.17 | 0 mass % | 10.0 mass % | 0 | 88 |
| Comparative Example 3 | 1.19 | 0 mass % | 20.0 mass % | 0 | 85 |
| Comparative Example 4 | 1.03 | 10.0 mass % | 0 mass % | 0 | 83 |

As can be understood from the results shown in Table 1, all of the test cells of the Examples had a higher capacity retention rate and a superior cycle characteristic as compared to the test cells of the Comparative Examples. In cases where the ratio (E1/E2) of the charge expansion ratio (E1) to the discharge expansion ratio (E2) of the negative electrode was 1.15 or greater (i.e., in Comparative Examples 1 to 3), a steep decrease in capacity retention rate was confirmed. Further, interestingly, in a case where the ratio (E1/E2) was less than 1.05 (i.e., in Comparative Example 4), a larger decrease in the capacity retention rate was observed. In other words, the cycle characteristic is specifically improved when the condition that the ratio (E1/E2) is greater than or equal to 1.05 and less than 1.15 is satisfied.

REFERENCE SIGNS LIST 10 non-aqueous electrolyte secondary battery
11 positive electrode
12 negative electrode
13 separator
14 electrode assembly
16 outer housing can
17 sealing assembly
18, 19 insulation plate
20 positive electrode lead
21 negative electrode lead
22 grooved portion
23 internal terminal plate
24 lower valve member
25 insulation member
26 upper valve member
27 cap
28 gasket
30 positive electrode core
31 positive electrode mixture layer
40 negative electrode core
41 negative electrode mixture layer

The invention claimed is:

1. A non-aqueous electrolyte secondary battery comprising a positive electrode, a negative electrode, and a non-aqueous electrolyte, wherein the negative electrode includes a negative electrode core and a negative electrode mixture layer formed on at least one surface of the negative electrode core, a ratio (E1/E2) of a charge expansion ratio (E1) to a discharge expansion ratio (E2) of the negative electrode is greater than or equal to 1.05 and less than 1.15, and, in the negative electrode mixture layer, a content of silicon material relative to a mass of negative electrode active material is greater than or equal to 3 mass % and less than or equal to 12 mass %, as the negative electrode active material, the negative electrode mixture layer contains:

graphite; a first silicon material (SiO) containing a silicon oxide phase and Si dispersed in the silicon oxide phase; and a second silicon material (LSX) containing a lithium silicate phase and Si dispersed in the lithium silicate phase, and a ratio of a mass of the LSX to a mass of the SiO is greater than or equal to 0.2 and less than or equal to 6.

2. The non-aqueous electrolyte secondary battery according to claim 1, wherein the negative electrode mixture layer contains the LSX in an amount of 1 mass % or more relative to the mass of the negative electrode active material.

3. The non-aqueous electrolyte secondary battery according to claim 1, wherein the negative electrode mixture layer contains carbon nanotubes in an amount of greater than or equal to 0.01 mass % and less than or equal to 0.1 mass % relative to the mass of the negative electrode active material.

4. The non-aqueous electrolyte secondary battery according to claim 1, wherein the negative electrode mixture layer contains carboxymethyl cellulose or a salt thereof, a styrene-butadiene copolymer, and polyacrylic acid or a salt thereof in an amount of greater than or equal to 0.1 mass % and less than or equal to 3 mass % relative to the mass of the negative electrode active material.

* * * * *